United States Patent
Park

(10) Patent No.: US 11,862,844 B2
(45) Date of Patent: Jan. 2, 2024

(54) ELECTRONIC APPARATUS INCLUDING ANTENNA

(71) Applicant: Samsung Electronics Co., Ltd., Suwon-si (KR)

(72) Inventor: Soopyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 17/251,708

(22) PCT Filed: Jun. 11, 2019

(86) PCT No.: PCT/KR2019/006990
§ 371 (c)(1),
(2) Date: Dec. 11, 2020

(87) PCT Pub. No.: WO2019/240459
PCT Pub. Date: Dec. 19, 2019

(65) Prior Publication Data
US 2021/0119323 A1    Apr. 22, 2021

(30) Foreign Application Priority Data

Jun. 11, 2018 (KR) .................. 10-2018-0066816

(51) Int. Cl.
*H01Q 1/24* (2006.01)
*H04B 1/40* (2015.01)
*H04M 1/02* (2006.01)

(52) U.S. Cl.
CPC .............. *H01Q 1/243* (2013.01); *H04B 1/40* (2013.01); *H04M 1/0249* (2013.01); *H04M 1/0274* (2013.01)

(58) Field of Classification Search
CPC . H01Q 1/243; H01Q 5/35; H04B 1/40; H04B 1/385; H04M 1/0249;
(Continued)

(56) References Cited

U.S. PATENT DOCUMENTS

| 8,493,272 B2 | 7/2013 | Ollikainen et al. |
| 8,502,739 B2 | 8/2013 | Ollikainen et al. |

(Continued)

FOREIGN PATENT DOCUMENTS

| CN | 107580094 A | * | 1/2018 | .......... H04M 1/0214 |
| JP | 2011-040845 A | | 2/2011 | |

(Continued)

OTHER PUBLICATIONS

International Search Report dated Oct. 2, 2019 in connection with International Patent Application No. PCT/KR2019/006990, 2 pages.

*Primary Examiner* — Hai V Tran
*Assistant Examiner* — Bamidele A Immanuel

(57) ABSTRACT

Disclosed is an electronic device. The electronic device according to an embodiment may include a first device and a second device that are coupled to each other or spaced from each other. The first device may include a first housing, a first antenna element having a first electrical length for transmitting or receiving a signal in a first frequency band, a communication circuit disposed inside the first housing and for transmitting and receiving the signal of the first antenna element, and a first ground member electrically connected to the first antenna element. The second device may include a second antenna element having a second electrical length, a second housing, and a second ground member disposed inside the second housing. The first antenna element and the second antenna element may be connected to each other, and operate as a third antenna element having a third electrical length for transmitting and receiving a signal in a second frequency band while the first device and the second device are connected to each other. The first ground member and the second ground member may be electrically connected to each other while the first device and the second device are connected to each other. In (Continued)

addition, various embodiments as understood from the specification are also possible.

15 Claims, 11 Drawing Sheets

(58) Field of Classification Search
CPC ............... H04M 1/0274; H04M 1/026; H04M 1/72412; H04M 1/0256
See application file for complete search history.

(56) References Cited

U.S. PATENT DOCUMENTS

| | | | |
|---|---|---|---|
| 9,653,786 B2 | 5/2017 | Kenoun | |
| 10,312,575 B2 | 6/2019 | Kim et al. | |
| 10,374,288 B2 | 8/2019 | Harris et al. | |
| 2003/0045246 A1* | 3/2003 | Lee | H04B 1/3838 455/575.1 |
| 2003/0117324 A1* | 6/2003 | Iwai | H01Q 1/362 343/702 |
| 2004/0063476 A1* | 4/2004 | Katagishi | H04B 1/3838 370/320 |
| 2007/0164913 A1* | 7/2007 | Sakamoto | H01Q 1/243 343/702 |
| 2007/0188391 A1* | 8/2007 | Tu | G06F 1/1616 343/702 |
| 2008/0081657 A1* | 4/2008 | Suzuki | H01Q 1/243 343/702 |
| 2008/0238787 A1* | 10/2008 | Lin | H01Q 1/2266 343/702 |
| 2008/0300028 A1* | 12/2008 | Uejima | H01Q 1/243 455/575.3 |
| 2009/0131125 A1* | 5/2009 | Hirai | H04M 1/0216 455/575.3 |
| 2009/0325655 A1* | 12/2009 | Sato | H01Q 1/48 455/575.3 |
| 2010/0220017 A1* | 9/2010 | Ollikainen | H01Q 1/44 343/702 |
| 2010/0227642 A1* | 9/2010 | Kim | H04M 1/72454 455/556.1 |
| 2010/0245178 A1* | 9/2010 | Hsieh | H01Q 1/243 343/702 |
| 2010/0265148 A1 | 10/2010 | Ollikainen et al. | |
| 2010/0295747 A1* | 11/2010 | Zeltser | H01Q 1/48 343/848 |
| 2010/0321255 A1* | 12/2010 | Kough | H01Q 1/243 343/702 |
| 2011/0234462 A1* | 9/2011 | Aoki | H01Q 1/243 343/702 |
| 2011/0260942 A1* | 10/2011 | Hashizume | H01Q 1/243 343/853 |
| 2011/0285607 A1* | 11/2011 | Kim | G06F 3/041 345/1.3 |
| 2012/0050975 A1* | 3/2012 | Garelli | G06F 1/181 361/679.01 |
| 2012/0062429 A1* | 3/2012 | Uno | H01Q 1/243 343/702 |
| 2012/0086610 A1* | 4/2012 | Nishikido | H01Q 1/243 343/702 |
| 2012/0112972 A1* | 5/2012 | Ogawa | H01Q 1/243 343/702 |
| 2012/0194394 A1* | 8/2012 | Togashi | H01Q 13/10 343/702 |
| 2012/0242702 A1* | 9/2012 | Sirpal | H04M 1/724 345/649 |
| 2012/0242703 A1* | 9/2012 | Sirpal | G06F 1/1616 345/173 |
| 2012/0282980 A1* | 11/2012 | Freund | H04M 1/0256 455/566 |
| 2013/0009829 A1* | 1/2013 | Kurihara | H01Q 9/42 343/702 |
| 2013/0009849 A1* | 1/2013 | Ohguchi | H01Q 21/28 343/893 |
| 2013/0050038 A1* | 2/2013 | Eom | H01Q 5/392 343/866 |
| 2013/0141303 A1* | 6/2013 | Huynh | H01Q 9/0442 343/878 |
| 2013/0208417 A1* | 8/2013 | Sirpal | G06F 1/3203 361/679.43 |
| 2014/0218314 A1* | 8/2014 | Kim | G06F 3/04883 345/173 |
| 2014/0329561 A1* | 11/2014 | Kim | H04M 1/72454 455/557 |
| 2015/0133198 A1* | 5/2015 | Watanabe | H04M 3/02 455/566 |
| 2015/0270618 A1* | 9/2015 | Zhu | H01Q 1/2258 343/702 |
| 2016/0112552 A1* | 4/2016 | Kim | H04M 1/724631 455/566 |
| 2016/0124569 A1* | 5/2016 | Sunwoo | G06F 3/1438 345/173 |
| 2016/0261728 A1* | 9/2016 | Kim | H04M 1/72454 |
| 2016/0380342 A1 | 12/2016 | Kenoun | |
| 2017/0018845 A1* | 1/2017 | Lee | H01Q 1/521 |
| 2017/0025743 A1 | 1/2017 | Kim et al. | |
| 2017/0033434 A1* | 2/2017 | Hong | H01Q 5/321 |
| 2017/0047950 A1* | 2/2017 | Chen | H01Q 9/42 |
| 2017/0048363 A1* | 2/2017 | Lee | H01Q 5/314 |
| 2017/0062930 A1* | 3/2017 | Chen | H01Q 1/243 |
| 2017/0110786 A1* | 4/2017 | Liu | H01Q 1/2266 |
| 2017/0141820 A1* | 5/2017 | Kim | H01Q 1/42 |
| 2017/0142241 A1* | 5/2017 | Kim | H04M 1/0218 |
| 2017/0162948 A1* | 6/2017 | Wong | H01Q 5/10 |
| 2017/0214123 A1* | 7/2017 | Park | H01Q 1/38 |
| 2017/0229760 A1* | 8/2017 | Karilainen | H01Q 1/2266 |
| 2017/0244151 A1* | 8/2017 | Han | H01Q 21/30 |
| 2017/0264721 A1 | 9/2017 | Yli-Peltola | |
| 2017/0271750 A1* | 9/2017 | Harris | H01Q 9/20 |
| 2017/0309990 A1* | 10/2017 | Shih | H01Q 7/00 |
| 2017/0310012 A1* | 10/2017 | Wong | H01Q 1/48 |
| 2017/0338546 A1* | 11/2017 | Wong | H01Q 7/00 |
| 2017/0346164 A1* | 11/2017 | Kim | H04M 1/0266 |
| 2017/0351297 A1* | 12/2017 | Kim | H01Q 1/243 |
| 2017/0352943 A1* | 12/2017 | Sung | H01Q 1/245 |
| 2018/0040942 A1* | 2/2018 | Lepe | H01Q 13/106 |
| 2018/0048359 A1* | 2/2018 | Kim | H01Q 1/42 |
| 2018/0090821 A1* | 3/2018 | Lee | H01Q 5/328 |
| 2018/0097287 A1* | 4/2018 | Matsuoka | H01Q 5/35 |
| 2018/0159226 A1* | 6/2018 | Huang | H01Q 1/48 |
| 2018/0366813 A1* | 12/2018 | Kim | H01Q 9/04 |
| 2019/0140342 A1* | 5/2019 | Lim | H04M 1/0216 |

FOREIGN PATENT DOCUMENTS

| | | | | |
|---|---|---|---|---|
| KR | 20130105195 A | * | 3/2012 | ......... H04M 1/0214 |
| KR | 10-1553722 B1 | | 9/2015 | |
| KR | 10-2017-0024914 A | | 3/2017 | |
| KR | 10-2017-0034915 A | | 3/2017 | |
| KR | 10-2017-0066944 A | | 6/2017 | |
| KR | 10-2017-0089482 A | | 8/2017 | |

* cited by examiner

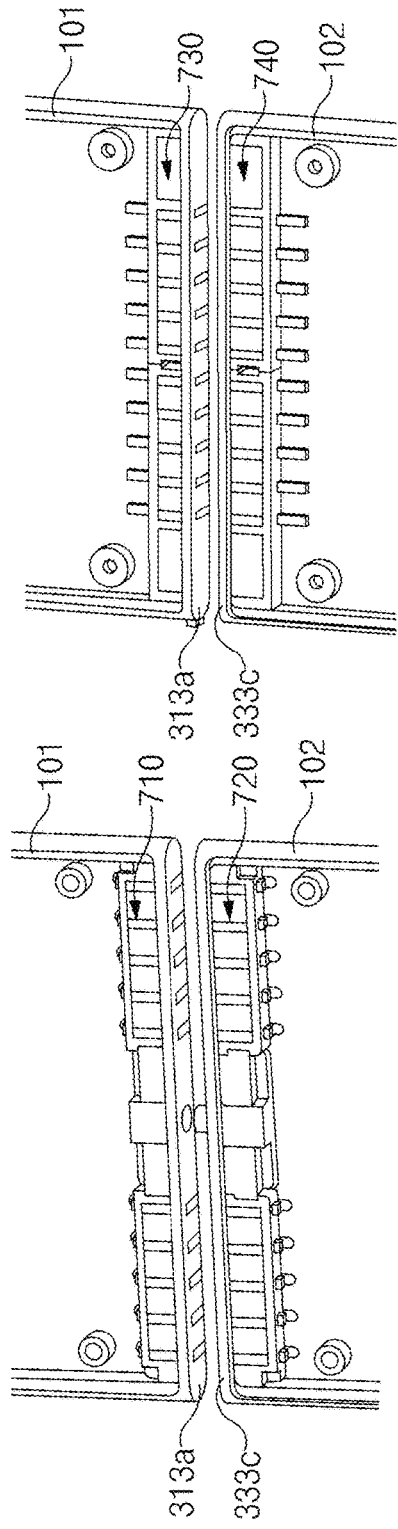
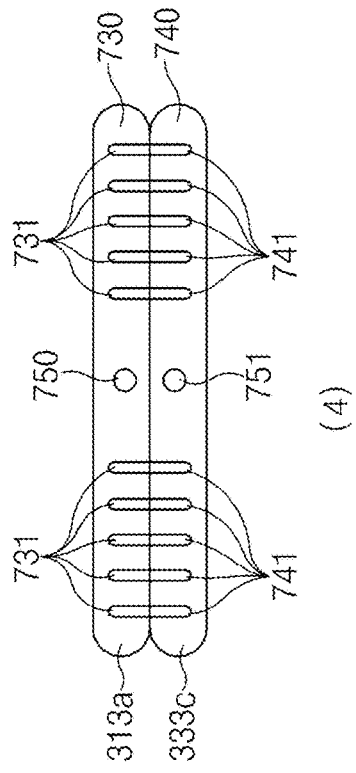
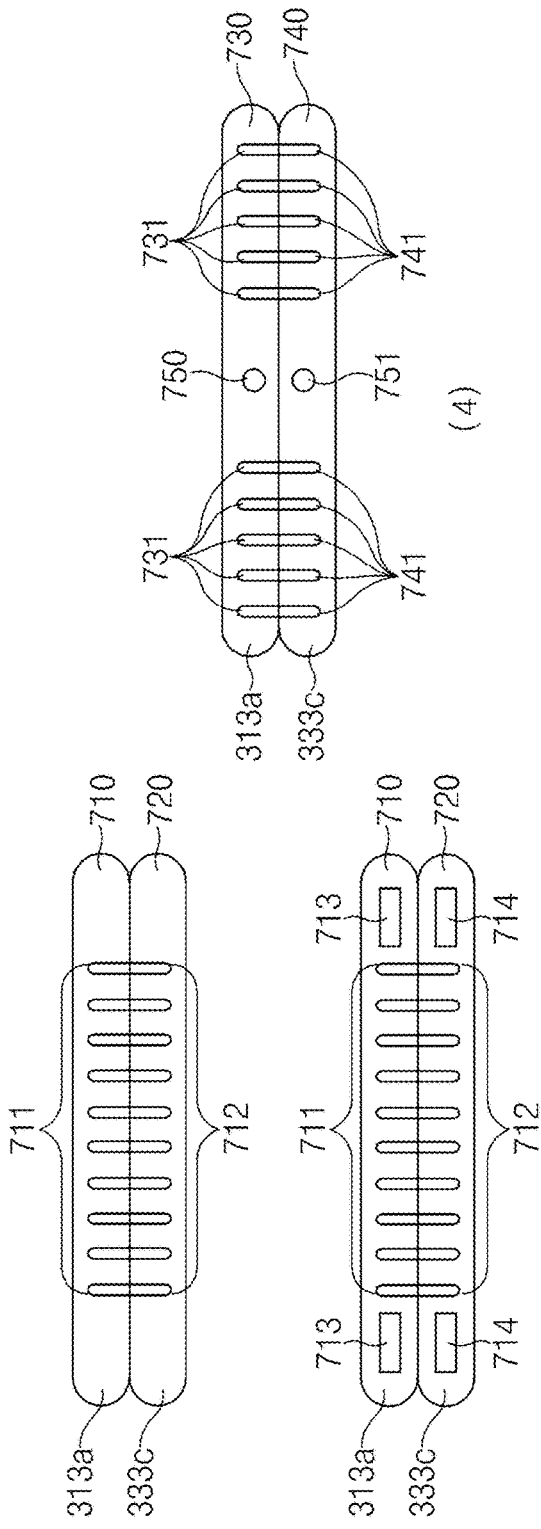
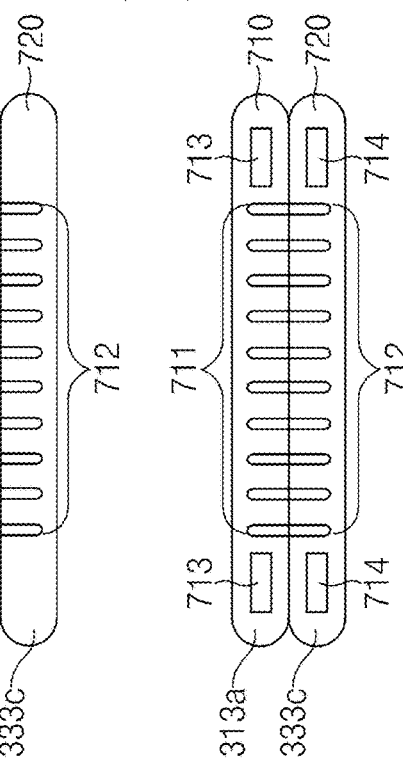

ELECTRONIC APPARATUS INCLUDING ANTENNA

CROSS-REFERENCE TO RELATED APPLICATIONS

This application is a 371 of International Application No. PCT/KR2019/006990 filed on Jun. 11, 2019, which claims priority to Korean Patent Application No. 10-2018-0066816 filed on Jun. 11, 2018, the disclosures of which are herein incorporated by reference in their entirety.

BACKGROUND

1. Field

Embodiments disclosed in this specification relate to an antenna capable of performing wireless communication with an external device and an electronic device including the same.

2. Description of Related Art

An electronic device such as a smartphone, a tablet personal computer (PC), or the like may transmit and receive a variety of data to and from an external device. The electronic device may perform long distance communication (e.g., mobile communication such as voice call or wireless data communication), short range communication (e.g., Bluetooth communication or wireless fidelity (Wi-Fi) communication), or ultra-short range communication (e.g., wireless payment, wireless charging, or NFC communication).

Nowadays, electronic devices provide broadband communication services, using a metal frame included in a part of the outer housing as an antenna or using an antenna in the form of a film or print formed on a back cover. Metal frames, printed antennas, or the like are implemented to form an electrical length required for wireless communication.

In the case of an electronic device operating while two or more devices are separated or coupled, it may be difficult to implement antennas having various electrical lengths due to the limitations of a mounting space. For example, when only one device of two or more devices includes an antenna, or when the antenna mounted on each device is independently operated, it may be difficult to implement an antenna having a long electrical length due to the limitations of the mounting space.

To solve the above-described problem, various embodiments of the disclosure provide an electronic device including an antenna in which two or more devices are capable of being coupled to one another.

SUMMARY

According to an embodiment disclosed in this specification, an electronic device may include a first device and a second device that are coupled to each other or spaced from each other. The first device may include a first housing, a first antenna element having a first electrical length for transmitting or receiving a signal in a first frequency band, a communication circuit disposed inside the first housing and for transmitting and receiving the signal of the first antenna element, and a first ground member electrically connected to the first antenna element. The second device may include a second antenna element having a second electrical length, a second housing, and a second ground member disposed inside the second housing. The first antenna element and the second antenna element may be connected to each other, and operate as a third antenna element having a third electrical length for transmitting and receiving a signal in a second frequency band while the first device and the second device are connected to each other. The first ground member and the second ground member may be electrically connected to each other while the first device and the second device are connected to each other.

According to various embodiments disclosed in this specification, it is possible to provide an electronic device capable of driving different antennas as needed, by variously adjusting electrical lengths of antennas.

According to various embodiments disclosed in this specification, a third antenna different from a first antenna and a second antenna may be driven, by coupling a first electronic device including the first antenna and a second electronic device including the second antenna.

According to various embodiments disclosed in this specification, the electrical length of the radiator of the third antenna may be extended by electrically connecting the radiator included in the first antenna and the radiator included in the second antenna. Accordingly, the third antenna may transmit and receive frequencies in the low band area.

According to various embodiments disclosed in this specification, the electronic device may provide ground layers capable of being coupled with each other. The area of the ground layer is expanded by coupling the ground layers included in different electronic devices, and the ground layers may form a more stable ground region. Accordingly, the performance of at least one antenna included in the electronic devices may be improved.

Besides, a variety of effects directly or indirectly understood through the specification may be provided.

BRIEF DESCRIPTION OF THE DRAWINGS

FIGS. 7A to 7D illustrate the arrangement and configuration of a connection structure according to an embodiment.

Figure 1A:
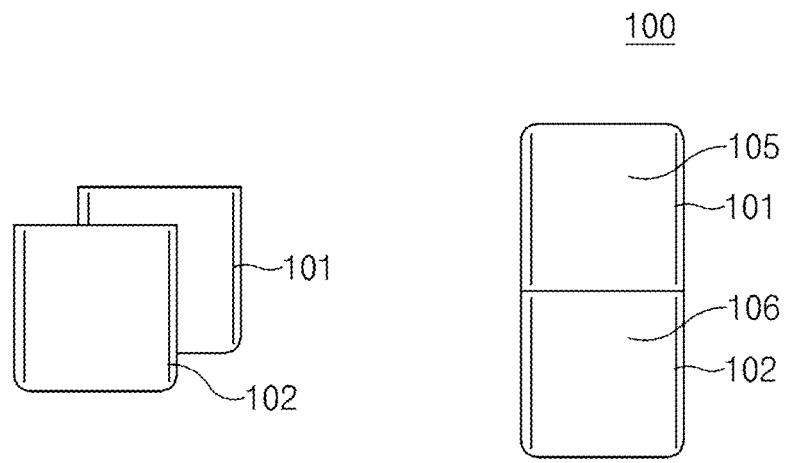
FIGS. 1A and 1B schematically illustrate an electronic device according to an embodiment.

With regard to description of drawings, the same or similar components will be marked by the same or similar reference signs.

DETAILED DESCRIPTION

Hereinafter, various embodiments of the disclosure may be described with reference to accompanying drawings.

Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

Figure 1B:
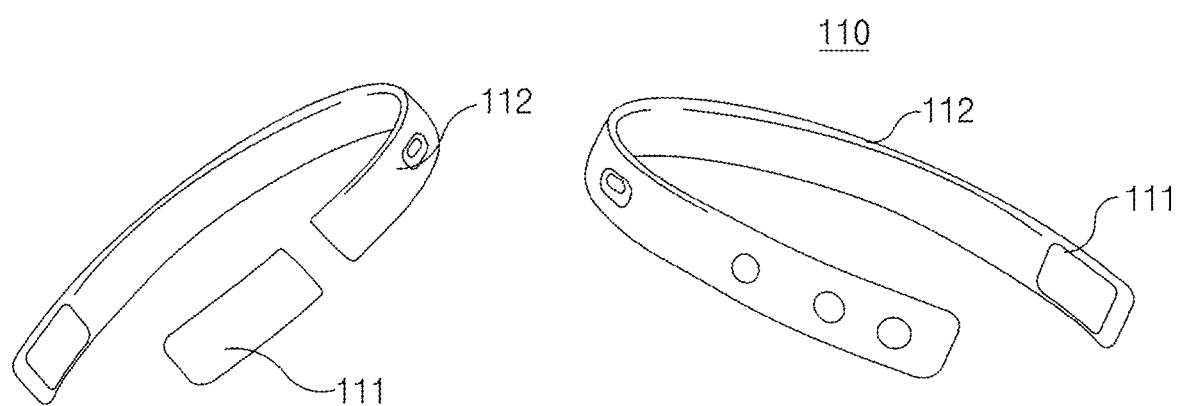

FIGS. 1A and 1B schematically illustrate an electronic device according to an embodiment.

FIGS. 1A and 1B illustrate various embodiments of electronic devices 100 and 110 including two or more devices 101, 102, 111, and 112 capable of being coupled to one another. FIG. 1A illustrates the plate-type electronic device 100, and FIG. 1B illustrates the wearable-type electronic device 110.

Referring to FIGS. 1A and 1B, the electronic device 100 may include the first devices 101 and 111 and the second devices 102 and 112 are capable of being electrically or physically connected to the first devices 101 and 111.

According to various embodiments, the first device 101 or 111 and the second device 102 or 112 may be coupled to each other to operate as a single electronic device 100 or 111. For example, the first device 101 may include a first display 105 and the second device 102 may include a second display 106. While the first device 101 and the second device 102 are physically or electrically connected to each other, the first display 105 and the second display 106 may function as a single display. For example, the first display 105 and the second display 106 may output a continuous screen.

According to an embodiment, the first device 101 or 111 may be a primary device or a main device, and the second device 102 may be a secondary device or an auxiliary device that operates in an auxiliary manner. According to an embodiment, the first device 101 or 111 may be a device capable of operating independently while being separated from the second device 102 or 112. According to various embodiments, the second device 102 or 112 may not operate independently while being separated from the first device 101 or may perform an operation that is dependent on the operation of the first device 101 or 111. For another example, the first device 101 or 111 and the second device 102 or 112 may operate independently while being separated from each other.

Referring to FIG. 1B, the first device 111 may be physically or electrically coupled to the second device 112. The first device 111 may be coupled such that the length of the first device 111 extends from the second device 112, or the first device 111 may be coupled to be seated in at least a partial region of the second device 112. For example, the second device 112 may include an opening in at least a part of housing, and the first device 111 may be coupled to the second device 112 through the opening.

FIGS. 1A and 1B illustrate a plate-type electronic device or a wearable electronic device, respectively, but the electronic device disclosed in the specification may be implemented in various forms including two or more devices capable of being coupled with each other. Hereinafter, various embodiments will be described using the plate-type electronic device 100, but the various embodiments described below may be applied to various types of electronic devices including two or more devices capable of being coupled with each other.

Figure 2C:
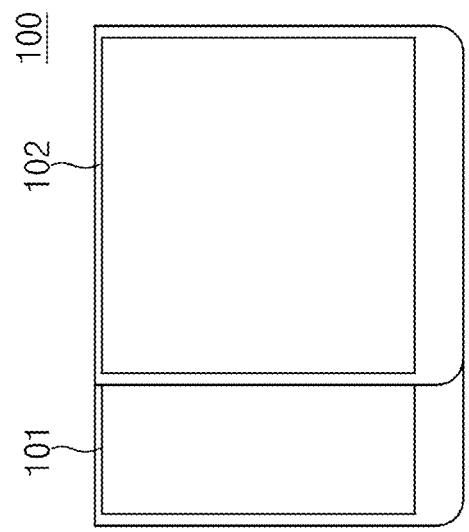
FIGS. 2A to 2C illustrate an operating mode of an electronic device according to an embodiment.
Figure 2B:
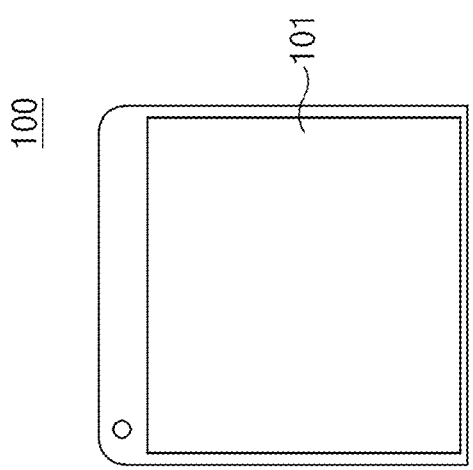
Figure 2A:
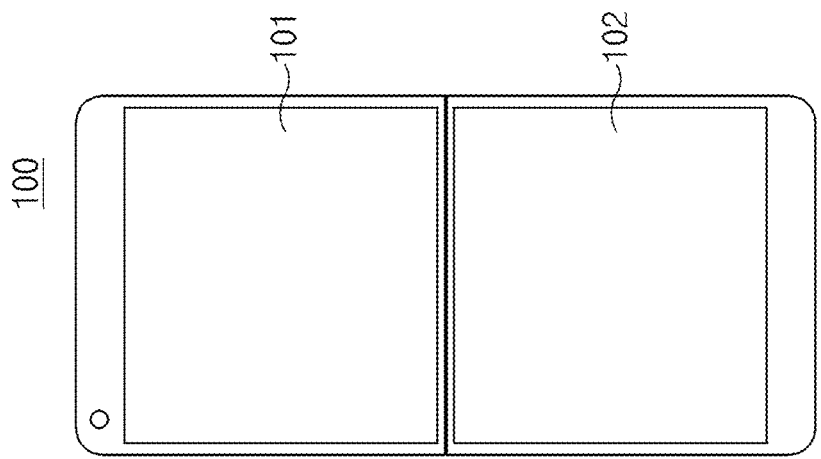

FIGS. 2A, 2B, and 2C illustrate an operating mode of an electronic device according to an embodiment.

Referring to FIGS. 2A, 2B, and 2C, the electronic device 100 (e.g., the electronic device 100 of FIG. 1) may support at least one of a bar mode (FIG. 2A), a dual mode (FIG. 2B), or a detach mode (FIG. 2C).

According to an embodiment, referring to FIG. 2A, bar mode may be an operating mode in which the first device 101 and the second device 102 are electrically or physically connected to each other to operate together. For example, in bar mode, the antenna elements of the first device 101 and the second device 102 may be connected to operate as a single antenna; alternatively, the displays of the first device 101 and the second device 102 may be connected to each other to operate as a single display.

According to an embodiment, referring to FIG. 2B, dual mode may be an operating mode in which the first device 101 and the second device 102 are electrically or physically separated from each other, but one device operates in association with the other device. For example, dual mode may be an operating mode in which the second device 102 transmits a signal to the first device 101 or the first device 101 transmits a signal to the second device 102 to perform an operation associated with each other, while the first device 101 and the second device 102 are spaced from each other.

According to one implementation, referring to FIG. 2C, detach mode may be an operating mode in which the first device 101 and the second device 102 are separated from each other to perform independent operations with each other, or to perform an operation that allows only one device to operate. In this case, the operation of any one of the first device 101 and the second device 102 may not affect the operation of another device.

Figure 3:
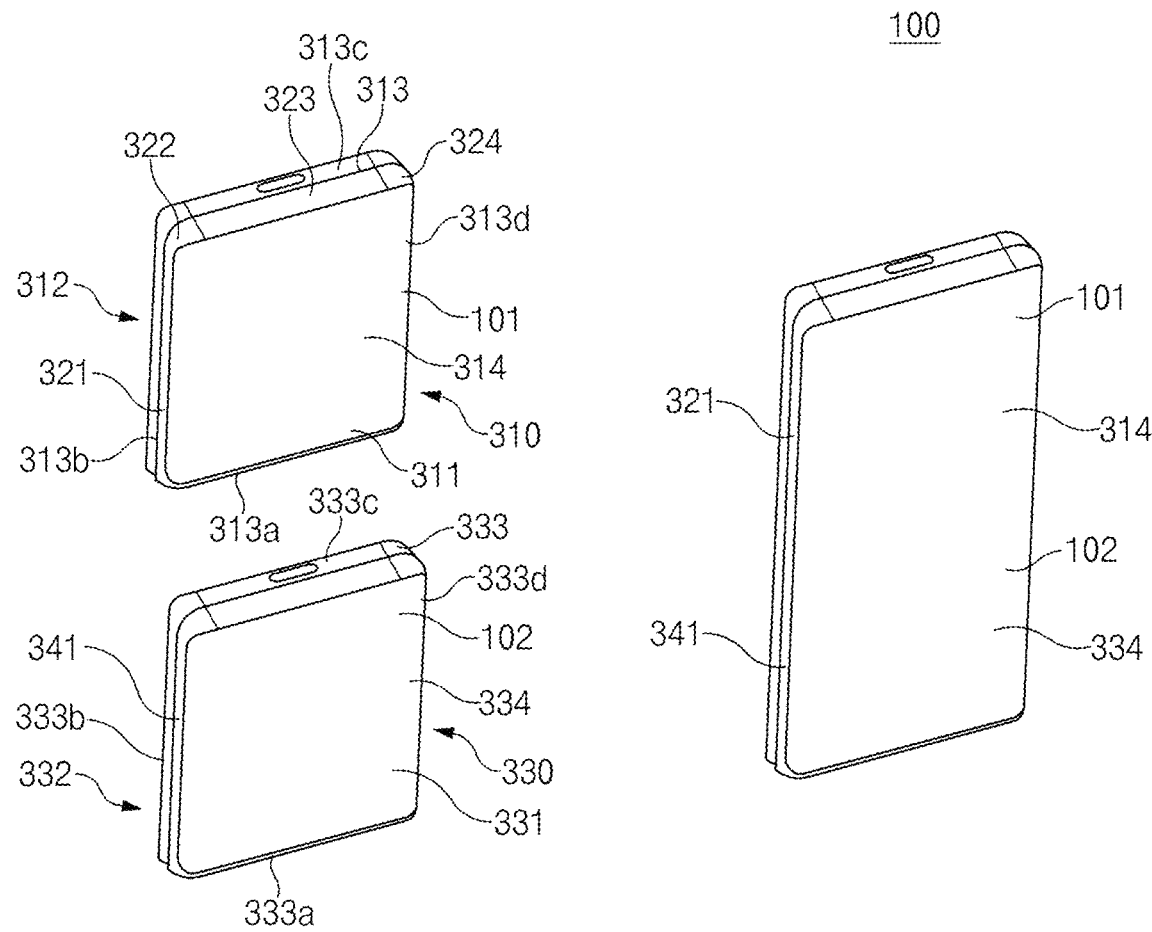
FIG. 3 illustrates a configuration of an electronic device according to an embodiment.

FIG. 3 illustrates a configuration of an electronic device according to an embodiment.

According to an embodiment, the electronic device 100 may include the first device 101 and the second device 102 that are capable of being coupled to each other.

Referring to FIG. 3, in the case where the first device 101 includes a first antenna element 321, and the second device 102 includes a second antenna element 341, the first antenna element 321 and the second antenna element 341 may be electrically or physically connected to each other when the first device 101 and the second device 102 are coupled to each other. For example, a first radiator included in the first antenna element 321 and a second radiator included in the second antenna element 341 may be electrically or physically connected to each other. For example, it may be understood that the first radiator and the second radiator are conductive members such as conductive patterns or conductive plates. In this case, the electrical length of the antenna including the first antenna element 321 may extend to the second antenna element 341. An antenna element formed by electrically connecting the first antenna element 321 to the second antenna element 341 may transmit and receive antenna signals in a frequency band lower than the frequency bands of the first antenna element 321 and the second antenna element 341.

According to an embodiment, the first device 101 may include first housing 310. The first housing 310 may include a first surface 311, a second surface 312 facing away from the first surface 311, a side member 313 surrounding a space between the first surface 311 and the second surface 312.

According to an embodiment, a first display 314 (e.g., the display 105 of FIG. 1) may be exposed to the outside through the first surface 311. The first display 314 may be a touch screen display. The first surface 311 may be the front surface of the first device 101; when the first device 101 is coupled to the second device 102, the first surface 311 may form the front surface of the electronic device 100.

According to an embodiment, the second surface 312 may be the rear surface of the first device 101. When the first device 101 is coupled to the second device 102, the second surface 312 may form the rear surface of the electronic device 100.

According to an embodiment, the side member 313 may include a plurality of sides. For example, the side member 313 may include a first side 313a, a second side 313b, a third side 313c, and a fourth side 313d. For example, the first device 101 may be coupled to the second device 102 through a portion (e.g., the first side 313a) of the side member 313.

According to an embodiment, the first device 101 may include the first antenna element 321 including a portion of the first housing 310. For example, the first antenna element 321 may include a portion of the side member 313. FIG. 3 illustrates that the first antenna element 321 includes at least part of the second side 313b, but the first antenna element 321 may be disposed to be coupled to the second antenna element 341 of the second device 102.

Referring to FIG. 3, the side member 313 may include a plurality of conductive regions 321, 322, 323, and 324 spaced from each other by a non-conductive material. At least one of the plurality of conductive regions 321, 322, 323, and 324 may operate as an antenna upon supplying an electrical signal. In this case, the first conductive region 321 among the plurality of conductive regions 321, 322, 323, and 324 may be the first antenna element 321. In this case, it may be understood that the first conductive region 321 is a radiator of the first antenna element 321. At least one of the other conductive regions 322, 323, and 324 may be an antenna element having an electrical length different from that of the first conductive region 321. For example, the electronic device may transmit or receive a global positioning system (GPS) signal, using the second conductive region 322 or may transmit or receive a Wi-Fi signal using the fourth conductive region 324.

According to an embodiment, the second device 102 may include second housing 330. The second housing 330 may include a first surface 331, a second surface 332 facing away from the first surface 331, a side member 333 surrounding a space between the first surface 331 and the second surface 332.

According to an embodiment, a second display 334 (e.g., the display 106 of FIG. 1) may be exposed to the outside through the first surface 331. The second display 334 may be a touch screen display. The first surface 331 may be the front surface of the second device 102; when the second device 102 is combined with the first device 101, the first surface 331 may form the front surface of the electronic device 100 together with the first surface 311 of the first device 101. In this case, the second display 334 may operate as a single display together with the first display 314.

According to an embodiment, the second surface 332 may be the rear surface of the second device 102. The second surface 332 may form the rear surface of the electronic device 100 when the second device 102 is coupled to the first device 101.

According to an embodiment, the side member 333 may include a plurality of sides. For example, the side member 333 may include a fifth side 333a, a sixth side 333b, a seventh side 333c, and an eighth side 333d. For example, the second device 102 may be coupled to the first device 101 through a portion (e.g., the seventh side 333c) of the side member 333.

According to an embodiment, the second device 102 may include the second antenna element 341 including a portion of the second housing 330. For example, the second antenna element 341 may include a portion of the side member 333. FIG. 3 illustrates that the second antenna element 341 includes at least part of the sixth side 333b, but the first antenna element 321 may be disposed to be coupled to the second antenna element 341 of the second device 102.

Referring to FIG. 3, the side member 333 may include at least one conductive region 341 specified by a non-conductive material. At least one conductive region 341 may operate as an antenna when an electrical signal is supplied. The second antenna element 341 may include the at least one conductive region 341. In this case, it may be understood that the at least one conductive region 341 is a radiator of the second antenna element 341.

According to an embodiment, for example, when the first device 101 and the second device 102 are coupled to each other, the first antenna element 321 and the second antenna element 341 may form an antenna having one electrical length formed by the first conductive region 321 and at least one conductive region 341.

Figure 4:
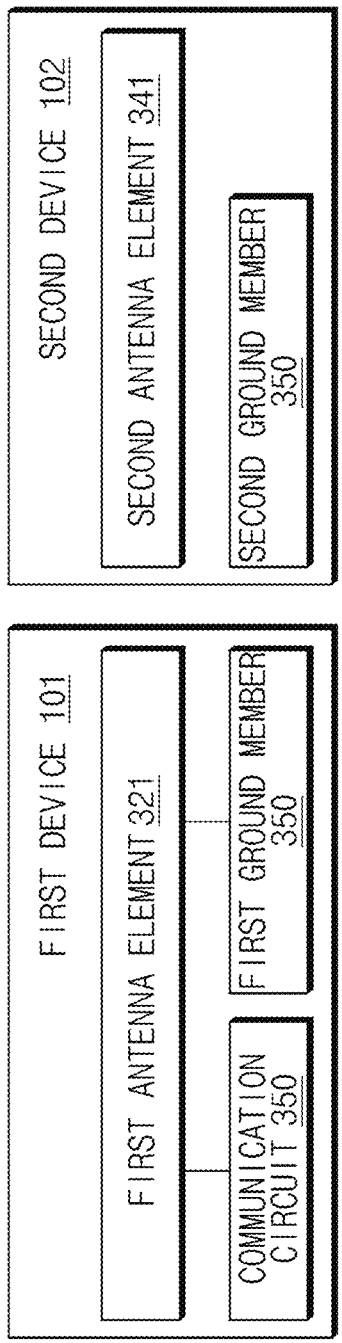
FIG. 4 illustrates a configuration of an electronic device according to an embodiment.

FIG. 4 is a block diagram illustrating a configuration of an electronic device according to an embodiment.

Referring to FIG. 4, an electronic device (e.g., electronic device 100 of FIGS. 1 to 3) may include the first device 101 (e.g., the first device 101 of FIGS. 1 to 3) and the second device 102 (e.g., the second device 102 of FIGS. 1 to 3).

According to an embodiment, the first device 101 may include the first antenna element 321, a communication circuit 350, and a first ground member 352. In addition, the first device 101 may include various configurations according to various embodiments disclosed in the specification. For example, the first device 101 may further include configurations illustrated in FIG. 11. For example, the first device 101 may further include configurations such as a processor, a display, or a battery.

According to an embodiment, the first antenna element 321 may include at least part of the housing of the first device 101 or may be disposed inside the housing. The first antenna element 321 may have a first electrical length for transmitting or receiving a signal in a first frequency band. The first antenna element 321 may function as an antenna by itself or may function as a single antenna by being coupled to another antenna element (e.g., the second antenna element 341).

According to an embodiment, the communication circuit 350 may supply an electrical signal to the first antenna element 321. For example, the communication circuit 350 may include a radio frequency (RF) circuit.

According to an embodiment, the first ground member 352 may be at least electrically connected to the first antenna element 321. The first ground member 352 may operate as a ground by itself, or may operate as a ground by being coupled to an additional ground member (e.g., a second ground member 360) together.

According to an embodiment, the second device 102 may include the second antenna element 341 and the second ground member 360. In addition, the second device 102 may include various configurations according to various embodiments disclosed in the specification. For example, the second device 102 may further include the communication circuit 350 or configurations illustrated in FIG. 11.

According to an embodiment, the second antenna element 341 may include at least part of the housing of the second device 102 or may be disposed inside the housing. The second antenna element 341 may have a second electrical length. The second antenna element 341 may function as an antenna by itself or may function as a single antenna by being coupled to another antenna element (e.g., the first antenna element 321).

According to an embodiment, the second ground member 360 may be electrically connected to at least one external antenna element (e.g., the at least first antenna element 321).

According to an embodiment, the second ground member 360 may not be electrically connected to the second antenna element 341, within the second device 102 or while the second device 102 is separated from the first device 101.

For another example, the second ground member 360 may be electrically connected to the second antenna element 341 while the second device 102 solely communicates with an external device. In this case, a communication circuit capable of supplying an electrical signal to the second ground member 360 may be included in the second device 102.

According to an embodiment, while the first device 101 and the second device 102 are coupled to each other, the first antenna element 321 and the second antenna element 341 may be physically or electrically connected to each other. In this case, the first antenna element 321 and the second antenna element 341 may operate as a third antenna element having a third electrical length for transmitting or receiving a signal in a third frequency band together. The frequency of the antenna signal transmitted and received by the third antenna element may have a frequency lower than the frequency of the signal transmitted and received by the first antenna element 321 and the second antenna element 341.

For example, the communication circuit 350 may transmit or receive the same signal at a specific point in time, using the first antenna element 321 and the second antenna element 341. In other words, while the first device 101 and the second device 102 are coupled to each other, the electronic device may transmit or receive a signal through an antenna having a relatively long electrical length as compared to a case where the devices are separated from each other. According to an embodiment, while the first device 101 and the second device 102 are coupled to each other, and the first antenna element 321 and the second antenna element 341 are coupled to each other to operate as a single antenna, the first ground member 352 and the second ground member 360 may operate as a single ground layer for the antenna. In this case, the single ground layer may be directly connected to the first antenna element 321 through the first ground member 352. A wider ground region may be formed by connecting the first ground member 352 and the second ground member 360. Accordingly, the performance of the first antenna element 321 may be improved.

According to an embodiment, while the first device 101 and the second device 102 are separated from each other, the first device 101 may transmit or receive a signal, using the first antenna element 321. In this case, the first antenna element 321 may be electrically connected to the communication circuit 350 and the first ground member 352.

According to an embodiment, the first antenna element 321 may solely have an electrical length for transmitting or receiving a signal in the first frequency band. While the first device 101 and the second device 102 are separated from each other, the electronic device (or the first device 101) may transmit or receive a signal with an external device through a first frequency band.

According to an embodiment, the first antenna element 321 and the second antenna element 341 may have an electrical length for transmitting or receiving a signal in a second frequency band together. The first device 101 and the second device 102 may transmit or receive a signal with an external device through the second frequency band while being coupled to each other. The second frequency band may be a lower frequency band than the first frequency band.

Figure 5A:
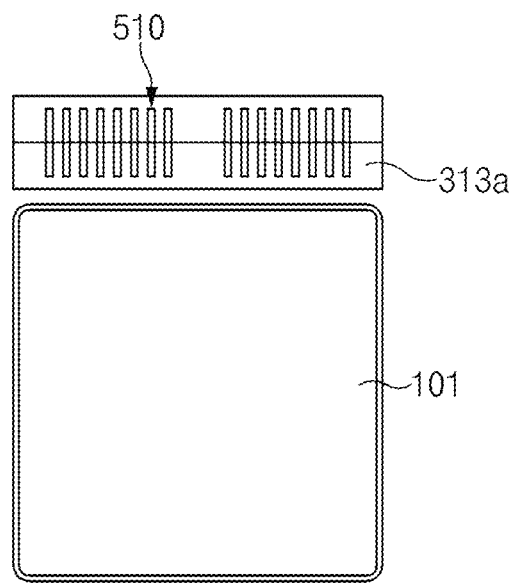
FIGS. 5A and 5B illustrate a connection structure between devices according to an embodiment.
Figure 5B:
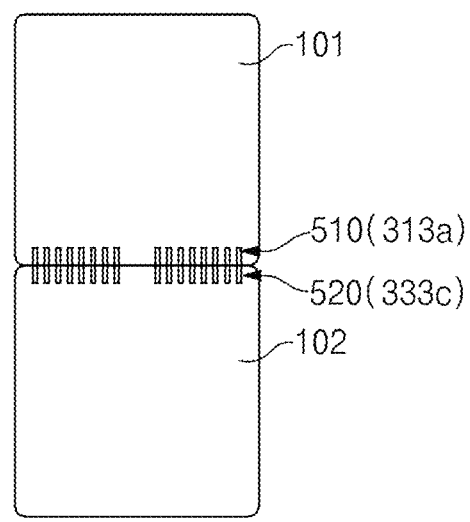

FIGS. 5A and 5B illustrate a connection structure between devices according to an embodiment.

Referring to FIGS. 5A and 5B, the first device 101 (e.g., the first device 101 of FIGS. 1 to 4) and the second device 102 (e.g., the second device 102 of FIGS. 1 to 4) may be connected to each other, using connection structures 510 and 520. According to an embodiment, the connection structures 510 and 520 may include at least one of a magnet and a pogo.

According to an embodiment, the connection structure 510 may be disposed in one portion of the first device 101 (e.g., the first side 313a of the side member); the connection structure 520 may be disposed in one portion (e.g., the seventh side 333c of the side member) of the second device 102; the connection structure 510 and the connection structure 520 may be used to couple the first device 101 to the second device 102.

Figure 6A:
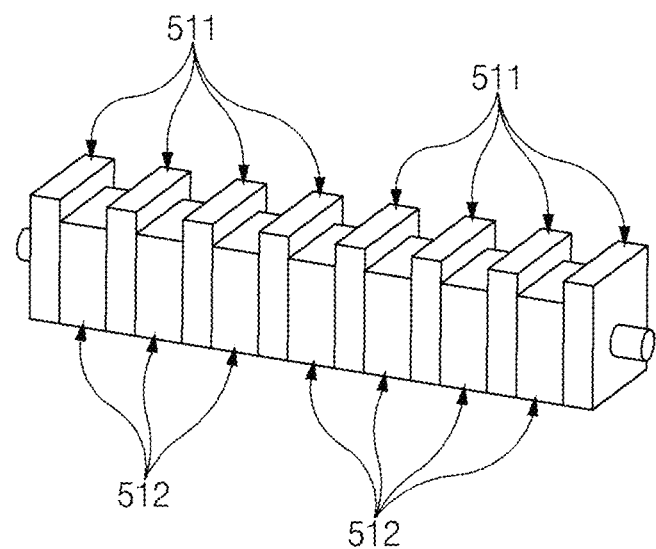
FIGS. 6A and 6B illustrate a configuration of a connection structure according to an embodiment.
Figure 6B:
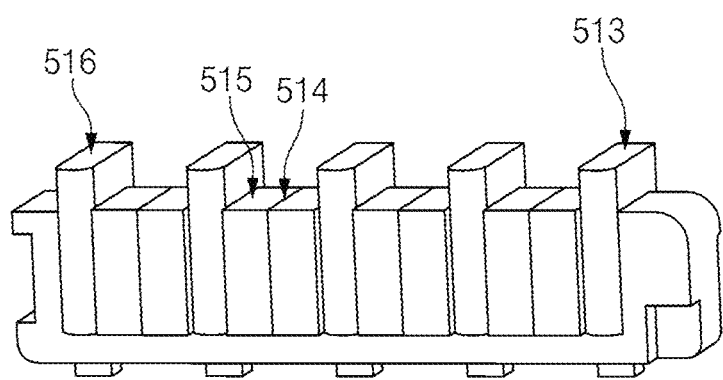

FIGS. 6A and 6B illustrate a configuration of a connection structure according to an embodiment.

FIGS. 6A and 6B illustrate the configuration of a connection structure applicable to the connection structure 510 of the first device 101 and the connection structure 520 of the second device 102.

Referring to FIG. 6A, the connection structure (e.g., the connection structure 510) may include a plurality of connection members 511 for signal connection between devices and/or a holding member 512 that enables a structure including the plurality of connection members 511 to be maintained.

According to an embodiment, the plurality of connection members 511 may include a magnet and/or a pogo. The respective connection member 511 is electrically or physically connected to the connection member of the second device 102; the first device 101 and the second device 102 may exchange electrical signals through the connection member 511.

According to an embodiment, the plurality of connection members 511 may include at least one of a first connection member electrically connected to the first ground member, a second connection member electrically connected to the first antenna element, and a third connection member for identifying the second device.

According to an embodiment, each connection member included in the plurality of connection members 511 may be referred to as a connection terminal or a pin; each connection terminal or pin may have various electrical functions. One of the plurality of connection members 511 may be a ground pin used for ground connection, and the other may be an antenna pin used for antenna connection. In addition, the plurality of connection members 511 may include pins for various purposes. For example, at least one of the plurality of connection members 511 may be an identification pin (e.g., an ID pin) for performing identification between devices.

Hereinafter, Table 1 illustrates the configuration of the plurality of connection members 511 of the first device 101 according to various embodiments; Table 2 illustrates the configuration of the plurality of connection members 511 of the second device 102 according to various embodiments.

TABLE 1

| Pin | | Description |
| --- | --- | --- |
| 1 | Vbat | Power supply |
| 2 | GND | Power supply (Ground) |
| 3 | I2C (SCL) | GPIO I2C clock |
| 4 | I2C(SDA) | GPIO I2C data |
| 5 | Interrupt | GPIO interrupt |
| 6 | Antenna | Low-band antenna |
| 7 | GND reinforcement | GND reinforcement |
| 8 | ID | TA, Accessory ID recognition |

TABLE 2

| Pin | | Description |
| --- | --- | --- |
| 1 | Vbat | Power supply |
| 2 | GND | Power supply (Ground) |
| 3 | I2C (SCL) | GPIO I2C clock |
| 4 | I2C(SDA) | GPIO I2C data |
| 5 | Interrupt | GPIO interrupt |
| 6 | Antenna | Low-band antenna |
| 7 | GND reinforcement | GND reinforcement |
| 8 | ID | TA, Accessory ID recognition |

According to an embodiment, the holding member 512 may allow each configuration of the plurality of connection members 511 to maintain the structure with strong tensile force. For example, the holding member 512 may include a guide magnet. The guide magnet may be disposed for each groove of the connection member 511. In particular, the guide magnet may be interposed between one connection member and another connection member adjacent to the one connection member. Referring to FIG. 6B, the connection structure (e.g., the connection structure 510) may include a plurality of connection members 513 and 515 for signal connection between devices and/or holding members 514 and 515 that enable a structure including the plurality of connection members 511 to be maintained.

According to an embodiment, at least one of a plurality of connection members 513 and 515 may be a plate 516. Hereinafter, the connection terminal or pin may be referred to as a first connection member, and the plate may be referred to as a second connection member.

According to an embodiment, to maintain the structure by the plurality of connection members 513 and 515, an insulator (spacer) 514 and/or magnet 515 may be included between a plurality of connection members.

FIGS. 7 to 10 illustrate an arrangement and configuration of a connection structure according to various embodiments.

FIGS. 7A to 7D illustrate that connection structures are disposed on the first side 313a (e.g., the first side 313a in FIG. 3) of the first device 101 and on the seventh side 333c (e.g., the seventh side 333c of FIG. 3) of the second device 102, respectively. However, the location where the connection structures are disposed may be variously modified.

Referring to FIGS. 7A to 7D, the first device 101 may include a first connection structure 710, and the second device 102 may include a second connection structure 720.

According to an embodiment, the first connection structure 710 and the second connection structure 720 may include a plurality of first connection members 711 and 712 disposed at regular intervals.

For another example, the first connection structure 710 and the second connection structure 720 may include at least one second connection members 713 and 714 in addition to the plurality of first connection members 711 and 712, respectively. For example, the first connection members 711 and 712 may include magnets or pogos, and the second connection members 713 and 714 may include plates.

According to an embodiment, the plurality of first connection members 711 may be interposed between at least one second connection member 713 and at least another second connection member 713. For example, the second connection member 713 may be disposed adjacent to opposite ends of the first side 313a. Similarly, the plurality of first connection members 712 of the second connection structure 720 may be interposed between at least one second connection member 714 and at least another second connection member 714. For example, the second connection member 714 may be disposed adjacent to opposite ends of the seventh side 333c.

Referring to→FIGS. 7C and 7D, the first device 101 may include a first connection structure 730, and the second device 102 may include a second connection structure 740.

According to an embodiment, a plurality of connection members 731 and 741 in the connection structures 730 and 740 may connect the first device 101 to the second device 102. In this case, the first device 101 and the second device 102 may further include additional connection members 750 and 751 to support the connection between the first device 101 and the second device 102, respectively. For example, the additional connection members 750 and 751 may include a groove or bump. For example, the additional connection member 750 of the first device 101 may include a groove, and the additional connection member 751 of the second device 102 may include a bump to provide a more rigid connection to the devices. For another example, the first device 101 may include a bump, and the second device 102 may include a groove.

According to an embodiment, the groove 750 may be interposed between the plurality of connection members 731, and the bump 751 may be interposed between the plurality of connection members 741. For example, the plurality of connection members 731 may be disposed to be divided into two groups with the groove 750 interposed therebetween; the plurality of connection members 741 may be disposed to be divided into two groups with the bump 751 interposed therebetween.

The first connection structure 730 and the second connection structure 740 may be configured to correspond to each other. For example, when the first connection structure 730 and the second connection structure 740 are connected to each other, the groove 750 and the bump 751 may be disposed to be connected to each other, and the plurality of connection members 731 and 741 may be disposed in contact with each other.

Figure 8:
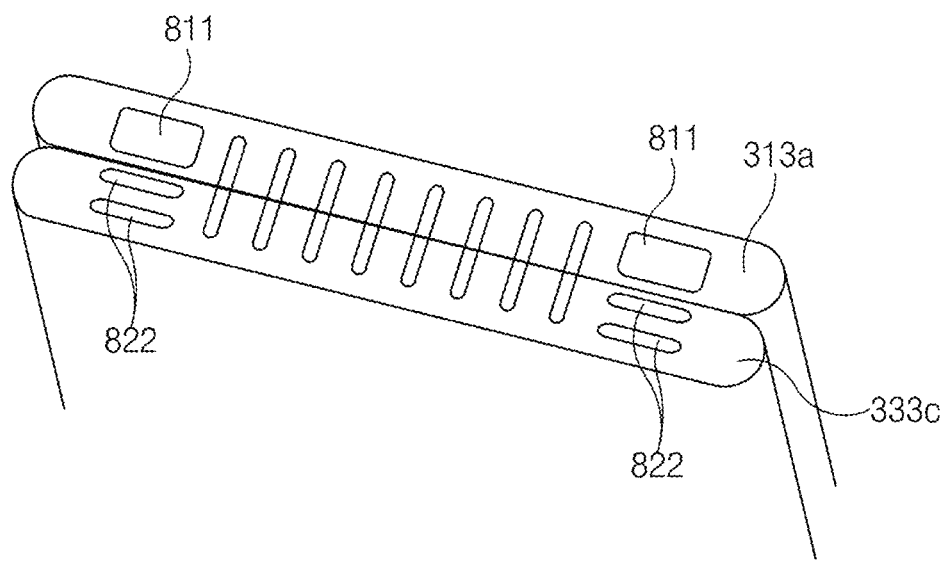
FIG. 8 illustrates a configuration of a connection structure according to an embodiment.

FIG. 8 illustrates the arrangement and configuration of a connection structure according to an embodiment.

Referring to FIG. 8, a connection structure 810 of the first device 101 and a connection structure 820 of the second device 102 may be implemented asymmetrically. According to an embodiment, while the first device 101 and the second device 102 are connected to each other, different types of connection members may be disposed at a location where the first device 101 and the second device 102 contact each other (or correspond to each other). For example, a first connection member 822 may be disposed in the second device 102 in response to a second connection member 811 of the first device 101.

FIGS. 9A to 9F illustrate an arrangement of a connection member according to various embodiments.

FIGS. 9A to 9F illustrate a cross-sectional view of the first device 101 when viewed from above the first side (e.g., the first side 313a of FIG. 3), and illustrates a cross-sectional view of the second device 102 when viewed from above the seventh side (e.g., the seventh side 333*c* of FIG. 3).

Referring to FIGS. 9A to 9F, the first connection member (e.g., the first connection member 731 of FIG. 7) and/or the second connection member (e.g., the connection member 732 of FIG. 7) may be disposed in the first device 101 and second device 102, in various numbers, in various directions, and/or in various arrangements.

Figure 9A:
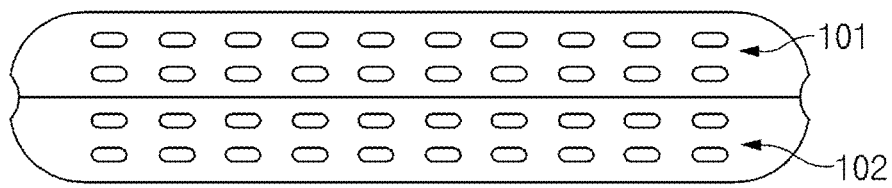
FIGS. 9A to 9F illustrate a configuration of a connection structure according to an embodiment.
Figure 9B:
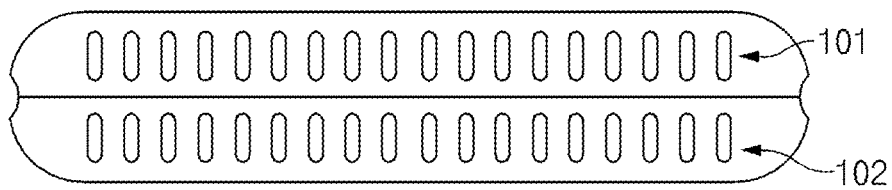
Figure 9C:
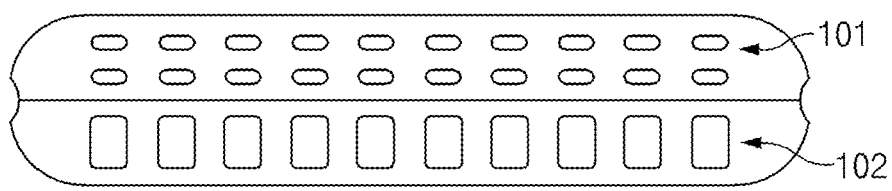
Figure 9D:
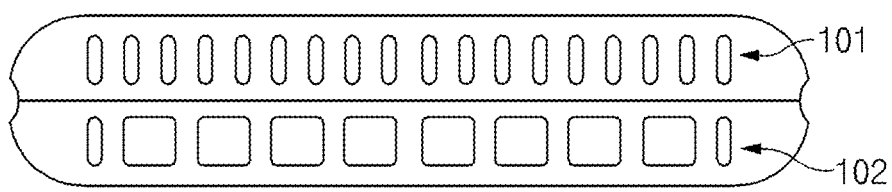
Figure 9E:
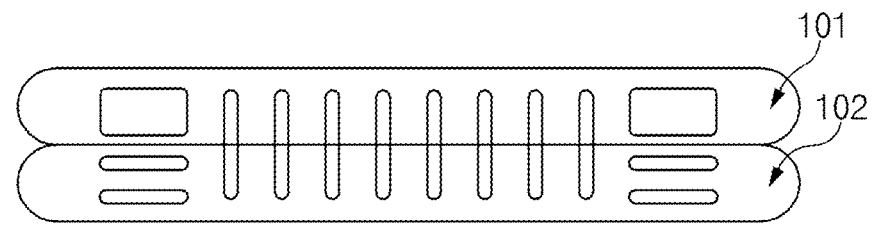
Figure 9F:
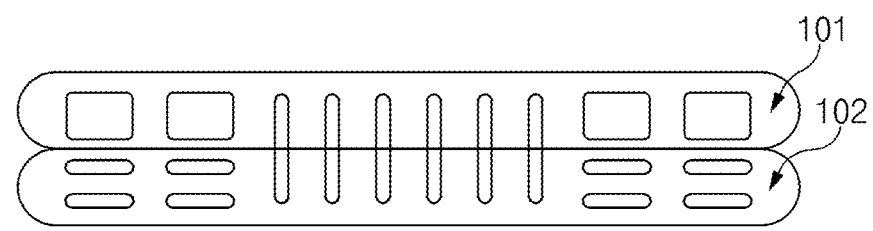

Referring to FIGS. 9B and 9B, connection members (e.g., the first connection member) may be disposed in various directions. For example, the connection member may be disposed to have a long length in a direction in which the side of a device extends; alternatively, on the other hand, the connection member may be disposed to have a short length in a direction in which the side extends.

Referring to FIGS. 9A and 9B, the first device 101 and the second device 102 may include connection members having the identical or symmetrical structures to each other.

Referring to FIGS. 9C to 9F, the first device 101 and the second device 102 may include connection members having different arrangement structures from each other. For example, the first connection member may be disposed in another device corresponding to a second connection member of any one device.

Referring to FIGS. 9A to 9F, connection members may be disposed in various numbers. In other words, the number of first connection members and the number of second connection members may be variously modified.

FIGS. 10A to 10D illustrate the arrangement and configuration of a connection structure according to an embodiment.

Referring to FIGS. 10A to 10D, a plurality of connection members 1011 (e.g., the plurality of connection members 511 of FIG. 6) may be exposed to the outside through at least one portion of a device (e.g., the first device 101 or the second device 102 of FIG. 1). For example, the plurality of connection members 1011 may be exposed to the outside through only one surface (e.g., the first side 313*a* of the side member) of the first device 101 or may be exposed to the outside through the one surface and the other surface (e.g., the second surface 312). The other surface may be a surface connected to the one surface.

Figure 10A:
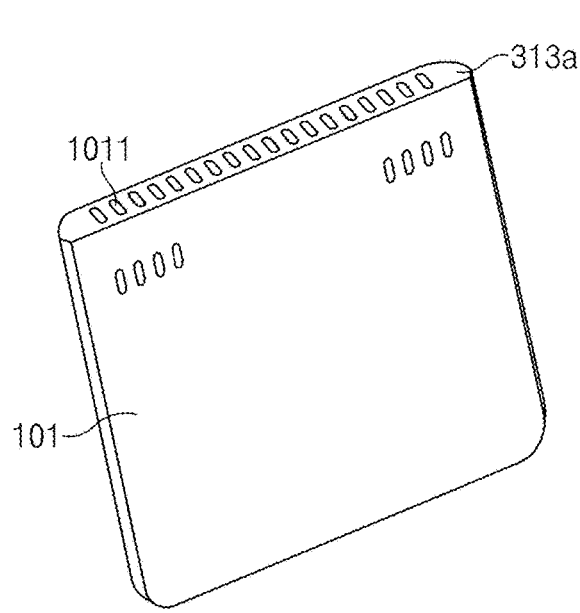
FIGS. 10A to 10D illustrate an arrangement of a connection structure according to an embodiment.

FIG. 10A illustrates that the plurality of connection members 1011 are exposed to the outside through only one surface; FIG. 10C illustrates that the plurality of connection members 1011 are exposed to the outside through the one side and the other side.

Figure 10B:
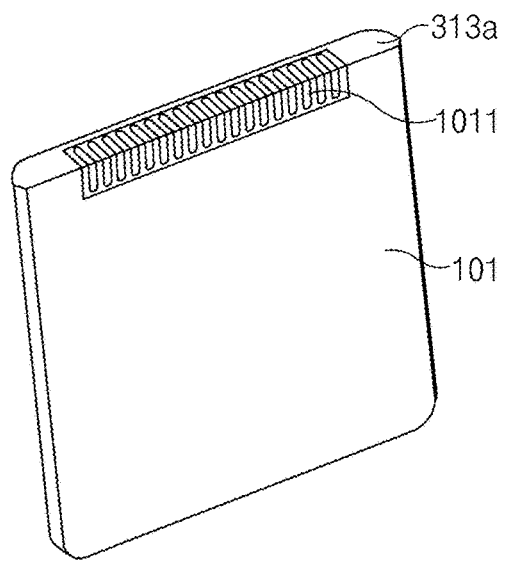
Figure 10C:
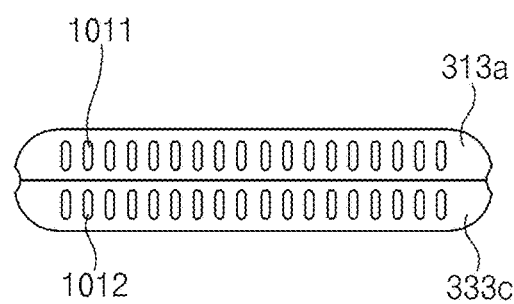
Figure 10D:
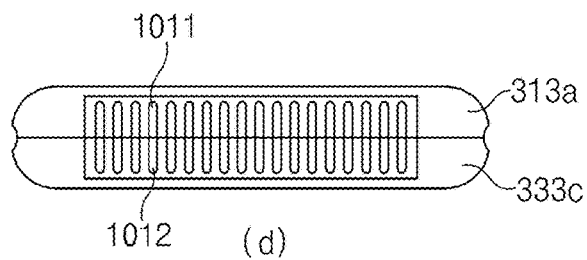

In the case of FIG. 10A, FIG. 10B illustrate the arrangement of the connection members when viewed from above the side 313*a* or 333*c* where the connection members of the first device 101 and the second device (e.g., the second device 102 of FIG. 1) are arranged; in the case of FIG. 10C, FIG. 10D illustrate the arrangement of the connection member when viewed from above the side 313*a* or 333*c*.

According to an embodiment, an electronic device (e.g., the electronic device 100 or 110 of FIG. 1) may include a first device (e.g., the first device 101 or 111 of FIG. 1) and a second device (e.g., the second device 102 or 112 of FIG. 1) that are coupled to each other or spaced from each other. The first device may include a first housing (e.g., the first housing 310 of FIG. 3), a first antenna element (e.g., the first antenna element 321 of FIG. 3) having a first electrical length for transmitting or receiving a signal in a first frequency band, a communication circuit disposed inside the first housing and for transmitting and receiving the signal of the first antenna element, and a first ground member (e.g., the first ground member 352 of FIG. 3) electrically connected to the first antenna element. The second device may include a second antenna element (e.g., the second antenna element 341 of FIG. 3) having a second electrical length, a second housing (e.g., the second housing 330 of FIG. 3), and a second ground member (e.g., the second ground member 360 of FIG. 3) disposed inside the second housing. The first antenna element and the second antenna element may be connected to each other, and operate as a third antenna element having a third electrical length for transmitting and receiving a signal in a second frequency band while the first device and the second device are connected to each other. The first ground member and the second ground member may be electrically connected to each other while the first device and the second device are connected to each other.

In the electronic device (e.g., the electronic device 100 or 110 of FIG. 1) according to an embodiment, the communication circuit disposed inside the first housing may transmit or receive a signal in the second frequency band through the first antenna element and the second antenna element while the first device and the second device are connected to each other.

In the electronic device (e.g., the electronic device 100 or 110 of FIG. 1) according to an embodiment, the first device may include a first connection structure (e.g., the first connection structure 710 of FIG. 7) for a connection to the second device, and the second device may include a second connection structure for a connection to the first device. The first connection structure may include a plurality of first connection members, and the second connection structure includes a plurality of second connection members.

In the electronic device according to an embodiment, the plurality of first connection members and the plurality of second connection members may include at least one of a magnet or a pogo.

In the electronic device according to an embodiment, the plurality of first connection members may include a holding member between respective connection members.

The holding member of the electronic device according to an embodiment may include at least one of a guide magnet and an insulator.

The plurality of first connection members of the electronic device according to an embodiment may include a first connection member electrically connected to the first ground member. The plurality of second connection members may include a second connection member electrically connected to the second ground member.

In the electronic device according to an embodiment, the plurality of first connection members may include a third connection member electrically connected to the first antenna element. The plurality of second connection members may include a fourth connection member electrically connected to the second antenna element.

In the electronic device according to an embodiment, the plurality of first connection members may include a fifth connection member for identifying the second device. The plurality of second connection members may include a sixth connection member for identifying the first device.

In the electronic device according to an embodiment, the first connection structure may include a groove (e.g., the groove 750 of FIG. 7) or a bump (e.g., the bump 750 of FIG. 7). The second connection structure may include a bump capable of being coupled to the groove, or a groove capable of being coupled to the bump.

At least one of the plurality of first connection members of the electronic device according to an embodiment may include a plate.

The first device of the electronic device according to an embodiment may include a first display exposed to an outside through the first housing. The second device may include a second display exposed to an outside through the second housing. The first display and the second display may operate as a single display while the first device and the second device are connected to each other.

The first antenna element of the electronic device according to an embodiment may include at least part of the first housing.

The second antenna element of the electronic device according to an embodiment may include at least part of the second housing. In an embodiment, the second frequency band may be a frequency band lower than the first frequency band.

Figure 11:
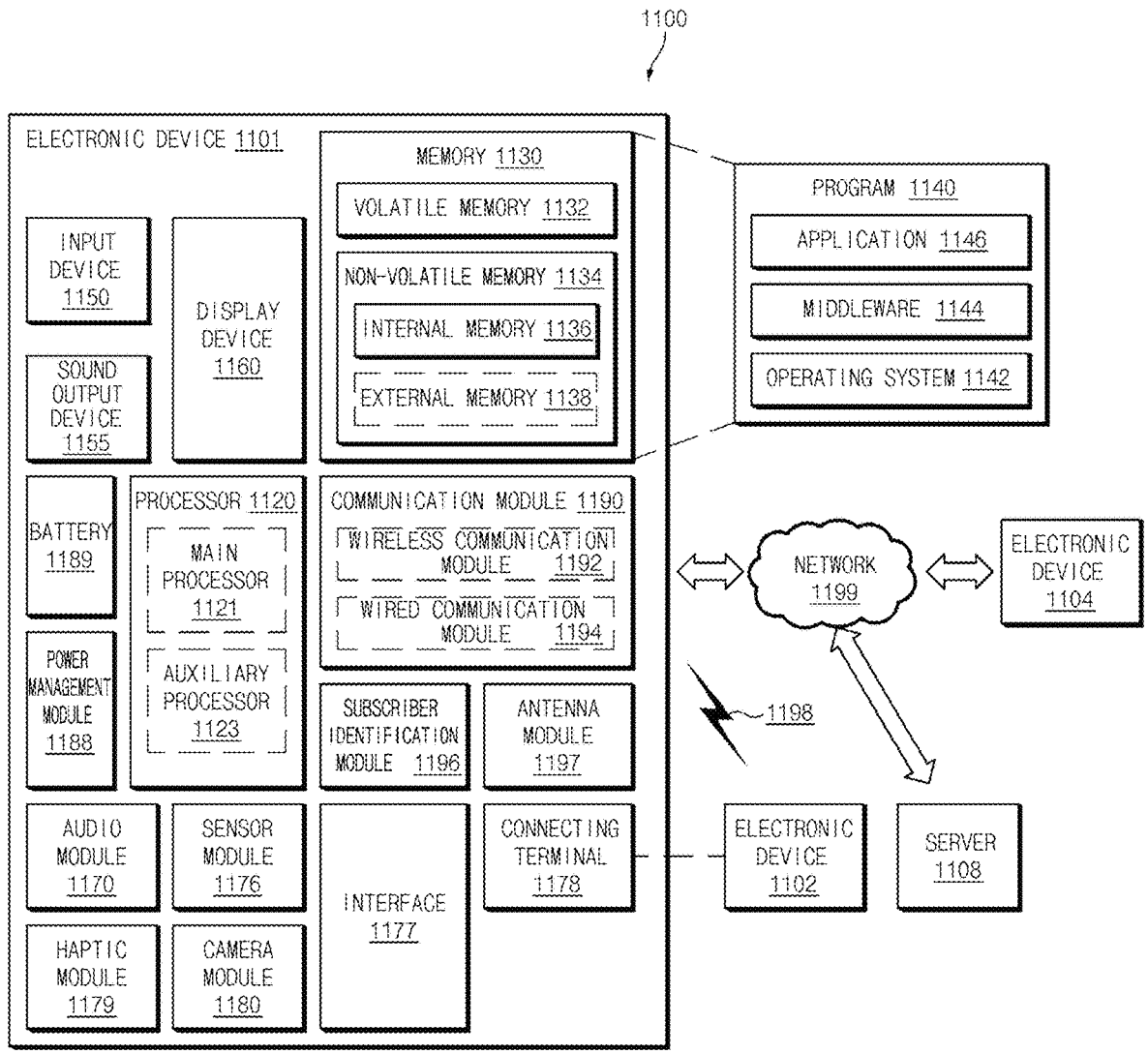
FIG. 11 is a block diagram of an electronic device in a network environment according to various embodiments.

FIG. 11 is a block diagram illustrating an electronic device 1101 in a network environment 1100 according to various embodiments.

Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190 (e.g., the communication circuit 350 of FIG. 4), a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in a volatile memory 1132, process the command or the data stored in the volatile memory 1132, and store resulting data in a non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thererto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 (e.g., the displays 105 and 106 of FIG. 1) may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or an external electronic device (e.g., an electronic device 1102) (e.g., speaker of headphone) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190. The signal or the power may then be transmitted or received between the communication module 1190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, when the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first device and a second device that are coupled to each other and that are configured to:
physically connect to each other to operate together as a single electronic device and such that a front surface of the first device and a front surface of the second device form a front surface of the electronic device; and
physically separate and be spaced from each other such that the second device operates independently or in an auxiliary manner,
wherein the first device includes:
a first housing;
a first antenna element having a first electrical length for transmitting or receiving a signal in a first frequency band;
a communication circuit disposed inside the first housing and configured to transmit and receive the signal in the first frequency band; and
a first ground member electrically connected to the first antenna element,
wherein the second device includes:
a second housing;
a second antenna element having a second electrical length and disposed inside the second housing; and
a second ground member disposed inside the second housing,
wherein the first antenna element and the second antenna element are connected to each other, and operate as a third antenna element having a third electrical length for transmitting and receiving a signal in a second frequency band while the first device and the second device are connected to each other, and
wherein the first ground member and the second ground member are electrically connected to each other and operate as a single ground layer for the third antenna element while the first device and the second device are connected to each other.

2. The electronic device of claim 1, wherein the communication circuit disposed inside the first housing transmits or receives a signal in the second frequency band through the first antenna element and the second antenna element while the first device and the second device are connected to each other.

3. The electronic device of claim 1, wherein the first device includes a first connection structure for a connection to the second device, and the second device includes a second connection structure for a connection to the first device, and wherein the first connection structure includes a plurality of first connection members, and the second connection structure includes a plurality of second connection members.

4. The electronic device of claim 3, wherein the plurality of first connection members and the plurality of second connection members include at least one of a magnet or a pogo.

5. The electronic device of claim 3, wherein the plurality of first connection members include a holding member between respective first connection members, which are adjacent to each other, from among the plurality of first connection members.

6. The electronic device of claim 5, wherein the holding member includes at least one of a guide magnet and an insulator.

7. The electronic device of claim 3, wherein the plurality of first connection members include a first connection member electrically connected to the first ground member, and
wherein the plurality of second connection members include a second connection member electrically connected to the second ground member.

8. The electronic device of claim 3, wherein the plurality of first connection members include a third connection member electrically connected to the first antenna element, and
wherein the plurality of second connection members include a fourth connection member electrically connected to the second antenna element.

9. The electronic device of claim 3, wherein the plurality of first connection members include a fifth connection member for identifying the second device, and
wherein the plurality of second connection members include a sixth connection member for identifying the first device.

10. The electronic device of claim 3, wherein the first connection structure includes a groove or a bump, and
wherein the second connection structure includes a bump capable of being coupled to the groove, or a groove capable of being coupled to the bump.

11. The electronic device of claim 3, wherein at least one of the plurality of first connection members includes a plate.

12. The electronic device of claim 1, wherein the first device includes a first display exposed to an outside through the first housing,
wherein the second device includes a second display exposed to an outside through the second housing, and
wherein the first display and the second display operate as a single display while the first device and the second device are connected to each other.

13. The electronic device of claim 1, wherein the first antenna element includes at least part of the first housing.

14. The electronic device of claim 1, wherein the second antenna element includes at least part of the second housing.

15. The electronic device of claim 1, wherein the second frequency band is a frequency band lower than the first frequency band.

* * * * *